Nov. 27, 1956    R. M. SHERMAN ET AL    2,771,904
FLOW CONTROL VALVE
Filed Dec. 8, 1952
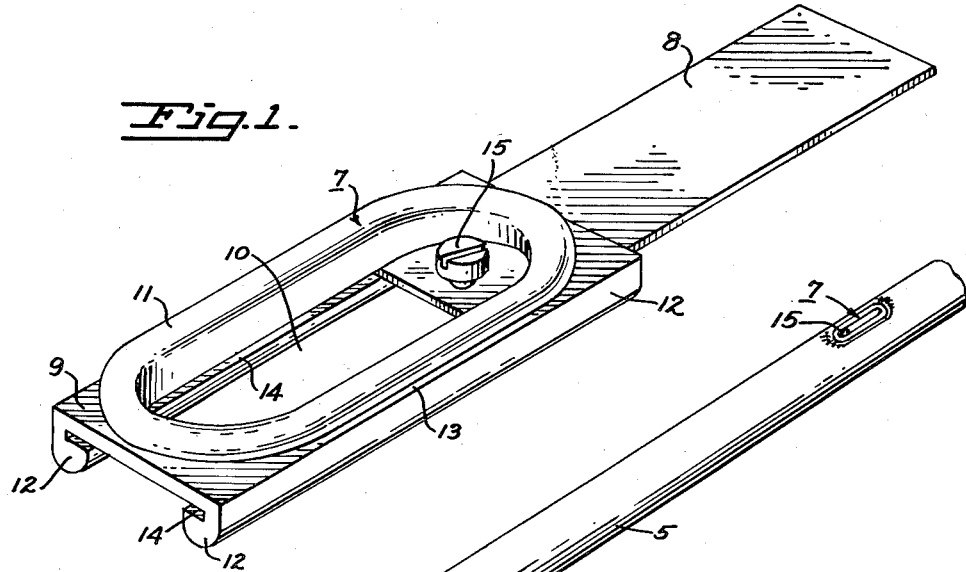
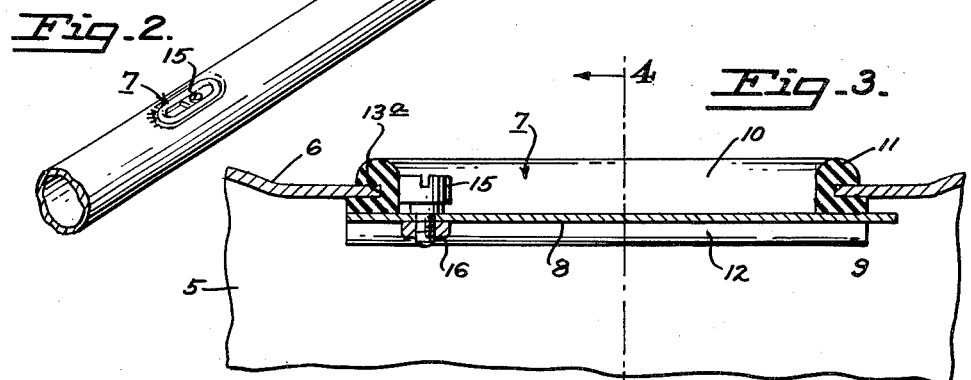
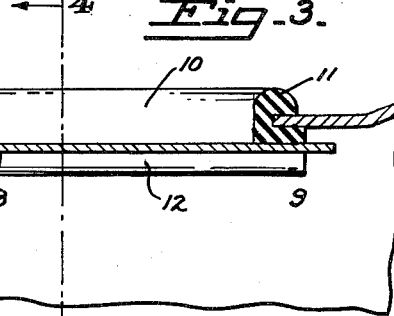
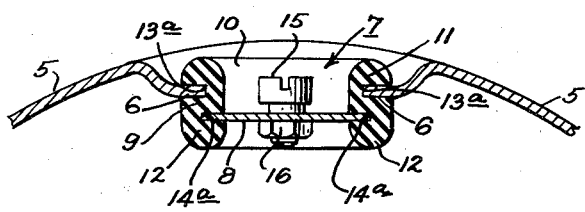
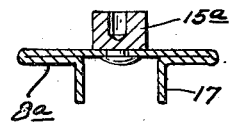
INVENTORS
ROGER M. SHERMAN
JAMES ROSS MOSHER
BY
ATTORNEY

United States Patent Office 2,771,904
Patented Nov. 27, 1956

2,771,904

FLOW CONTROL VALVE

Roger M. Sherman, Palo Alto, and James R. Mosher, San Jose, Calif., assignors to W. R. Ames Company, San Francisco, Calif., a corporation of California Application December 8, 1952, Serial No. 324,735

8 Claims. (Cl. 137—454.2)

This invention relates to gate valves for irrigation pipe, and particularly to a flow control valve adapted to control an outlet opening in one side of the pipe by means of a slide gate. It is also applicable to perforations in the walls of bins or other walled receptacles.

Heretofore, gate valves have generally been crimped, welded, or soldered in the wall of irrigating pipe sections, usually at the factory, before the pipe sections were assembled into the completed pipe line. The pipe sections were then piled in close relation on trucks, and moved to the assembly area. There was considerable danger that the pipe sections would roll or slide relative to each other during transportation, and parts of the valve structure would be damaged or knocked off. When this occurred, additional pipe sections or expensive repairs in the field to the damaged pipe section were required.

Often, a defective or damaged valve would only be discovered after the pipe line had been assembled and put in use; or after extended use the valves would require replacement. In each case, it was necessary to shut down the line in order to make repairs, or to replace the pipe section.

Also gates so fastened to the pipe would occasionally rust out rendering the whole length of pipe useless. Such difficulties were overcome only at considerable loss in time, transporation, and labor costs.

The present invention is intended to provide an inexpensive, easily manufactured valve that can be readily installed in the field on assembled pipe sections without the need of costly tools and without necessitating an extensive shut down.

Another object of this invention is to provide a valve that may be quickly inserted into a perforation in a pipe from the outside, and which will not be "blown out" by high liquid pressures inside the pipe.

Another object of this invention is to provide a resilient frame for a flow control valve that may be installed quickly by hand, and which seals itself to the pipe and to the gate.

Other objects and advantages of the invention will be apparent from the following description and from the drawings in which:

Fig. 1 is a perspective view of the flow control valve of this invention;

Fig. 2 is a perspective view of a pipe section showing two of the flow control valves mounted therein;

Fig. 3 is a longitudinal section of the valve as mounted in the pipe;

Fig. 4 is a transverse section of the valve and pipe on the line 4—4 of Fig. 3.

Fig. 5 is a transverse section of a modified form of the sliding gate, usable in the valve of this invention.

The broad aspect of the invention is the provision of a valve having a flexible, self-sealing mounting ring to fit a perforation in the wall of a pipe or receptacle, having means to support a slidable gate on the inside of the pipe or receptacle, which valve can be inserted from the outside by a workman without tools and in a few seconds time.

In the drawings the numeral 5 denotes a standard type of sheet metal irrigation pipe formed intermediate its ends with one or more longitudinal flattened portions 6 along one or both sides of the pipe. Each flattened portion is perforated, preferably with circular ends. The invention concerns a valve structure to fit in each such perforation. The flattened portions 6 are preferably depressed, as with a die-forming tool, so that the valve frame will be below the pipe wall. However, this form of the pipe is not a limiting feature of the present invention.

The valve comprises a frame 7 preferably of molded resilient material and a flat gate 8 slidable in the frame 7. The gate may be of metal, plastic, or other stiff material.

The molded frame preferably comprises a flat body portion 9 adapted to seal against the inside wall of the pipe bordering the perforation. The body 9 has an elongated opening 10, smaller, but corresponding generally to the pipe opening; a radially upstanding, continuous flange 11; and a pair of radially depending parallel flanges 12. The flange 11 is formed outwardly of the opening 10 and combines with the rectangular body portion 9 to form a continuous groove 13, which completely embraces the metal around the perforation. The periphery of the base of this groove 13 corresponds generally to the periphery of the perforation in the pipe wall. The flanges 12 extend from the inner side of the body portion 9, parallel to the longitudinal sides of the opening 10; and are turned inwardly to form straight rectangular grooves 14, opening toward the slot 10 to receive the slidable gate 8.

The gate 8 is provided with a handle 15, which may be a simple wide headed stud, held in position by a nut, such as 16, or a simple shoulder rivet, such as rivet 15a, shown in Fig. 5.

The gate 8 is initially installed in the frame 7 by spreading the elastic flanges 12 to insert the handle 15. Thereafter the gate 8 will slide in grooves 14 without any danger of its slipping out during shipment or use, since the handle 15 acts as a stop. Fig. 5 shows a modified reinforced gate structure 8a bent from a single piece of metal. The longitudinal strips 17 reinforce the slide and prevent its bending when high pressures are applied.

The assembled valve unit may be inserted endwise into a perforation in the pipe section 5, from the outside. Preferably the gate 8 is moved so it is in open position. The resilient valve body is then deformed while inside the pipe, and the rim 11 is snapped into position around the perforation. One finger inside the open valve supports the body while this operation is carried out.

A feature of this invention is the resistance of the valve to "blow out," i. e., the forcing of the valve out of its mounting in the pipe due to high internal pressure. To achieve this result, the grooves 13 and 14 are so spaced that the transverse distance between the internal walls 14a of groove 14 always exceeds a similar transverse distance between the internal walls 13a of grooves 13. Also, both the body portion 9 and the gate 8 are constructed to have greater length and width than the pipe opening, to further achieve this object. The end result is a gasketing effect caused by a groove "overlap" both at the ends and side of the frame 7.

As seen in Fig. 4, grooves 13 and 14 provide a longitudinal overlap, and any internal pressure on gate 8 squeezes body portion 9 tight against the flattened pipe portion 6; thereby both providing a seal and preventing valve blow out. A similar effect is produced on the ends of the valve by the rounded portions of groove 13 and the extended ends of gate 8, as shown in Fig. 3.

To operate the valve, the slide gate 8 may be opened by handle 15 to any desired position. Should a valve need replacement, it may be easily removed by hand and a new one inserted, without the use of costly tools. The expense involved in such an installation is held to a minimum and the entire operation may be carried out quickly and easily on a completely assembled irrigation pipe line.

If it is desired to install the gate and its rubber frame in a pipe 5 without flattening the area 6, then the rubber frame 9 is molded with a groove 13 to conform generally to the curvature of the pipe 5 so that when installed in the pipe there will be a leak-proof fit in the groove 13 as well as for the valve gate in the slot 14.

While the perforations in the pipe and the groove 13 are shown as oblong, they could be square, or of any other desired shape, so long as the grooves 14 are arranged to support the gate 8 in slidable relation beneath the opening 10.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

The simple manner in which this valve may be removed from a pipe wall and a new one placed therein is as follows: Suppose for some reason a valve needs replacing. The water is turned off. The workman slides the gate 8 to full open position and inserts one finger into the opening, bending the finger in under the end of the gate in the region of the stop 15. With his other hand he pushes the opposite rims 11 toward each other, thus sliding the groove 13 off the edge of the perforations in the pipe. As he does this, he pushes the flexible valve housing inside the pipe until the whole unit is inside the pipe suspended on his finger. It is then easy to turn the unit sidewise and pull it out through the perforation. To install the new valve is the reverse of the above. The workman introduces the whole unit inside the pipe through the perforation and holds it by one finger in the hole 10. With pressure applied by this finger, he brings the rim 11 up under the perforation and with fingers of his other hand he bends the rims together enough so the groove 13 is placed in position to embrace the area bordering the perforation. Once this is accomplished the job of installing the new valve is complete. Of course, it is possible that some simple inexpensive tool may be devised to further simplify installation, but it is apparent that no such tool is required. The tremendous saving in time over previous devices for valving pipes; the saving in shut-down time for repairs to valves; and the leak-tight nature of the valve highlight the improvement this invention has brought to this art.

What is claimed is:

1. In a flow control valve adapted for insertion in a perforation in the wall of a pipe or like surface, the combination of a resilient molded body member having a rim defining a flow opening; a radially extending open groove bordering said rim, conforming at its base to the general shape of the perforation in said wall; an open straight groove on the inner surface of one edge of said rim facing, parallel and in the same plane as a second like groove thereon on the opposite edge, the two said grooves forming a support; and a rigid gate member slidable in said last mentioned grooved support to control the flow through said wall.

2. The device of claim 1 in which the size of said gate when in closed position is such that it overlaps the edges of said perforation.

3. A flow control valve for an irrigation pipe adapted to be seated in a perforation in a pipe comprising: an integral flexible, resilient, molded, elastic frame including, a body portion having elongated sides and an elongated slot, a continuous flange extending upwardly and outwardly from one side of said slot to form a continuous external groove, parallel flanges extending downwardly and inwardly from said elongated sides, to form parallel internal grooves on the other side of said slot; and a flow control gate having parallel sides adapted to slide in said parallel grooves; said body portion being of greater size than the perforation in the pipe, whereby the frame may be inserted endwise into said pipe opening from the outside thereof, may be held securely therein by means of said continuous flange, and will resist internal pressure on said flow control valve.

4. The device of claim 3 wherein the internal walls of said parallel grooves are spaced farther from said elongated slot than the internal walls of said continuous groove, whereby the flow control valve further resists internal pressure on said flow control gate.

5. The device of claim 4 wherein said flow control gate is of greater length than the corresponding opening in said irrigation pipe to further prevent the flow control valve from being forced through said pipe opening by internal pressure.

6. The device of claim 4 wherein the elastic frame is made of rubber.

7. In a flow control valve for irrigation pipes, a flexible, molded resilient frame adapted to be seated in the periphery of an opening in a pipe comprising; a flat body portion having an elongated slot with rounded ends; a radially extended peripheral supporting flange surrounding said slot to engage the pipe opening; and parallel flanges extending radially inward from outer edges of said body adapted to engage a slidable gate.

8. In a flow control gate valve for irrigation pipe; a unitary resilient molded, elastic, non-metallic frame adapted to be seated in the periphery of an opening in a pipe comprising; a flat elongated rectangular body portion having an elongated slot therein; a pair of longitudinal flanges extending from one side of said body portion to form parallel rectangular grooves adjacent and opening toward said elongated slot; a continuous flange extending from the other side of said body portion, completely around said elongated slot, to form a continuous rectangular groove spaced from and opening away from said elongated slot; whereby the resilient frame may be readily secured in said pipe opening by means of said continuous flange.

References Cited in the file of this patent
UNITED STATES PATENTS

| | | |
|---|---|---|
| 2,074,607 | Frey | Mar. 23, 1937 |
| 2,451,678 | Johnson | Oct. 19, 1948 |
| 2,499,738 | Folsom | Mar. 7, 1950 |